G. E. SCOTT.
JOINING LINK FOR CHAINS.
APPLICATION FILED DEC. 1, 1909.

956,192.

Patented Apr. 26, 1910.

Witnesses:
Edward Rowland
M. A. Butter

George E. Scott
Inventor
By his Attorney H. MacKaye

UNITED STATES PATENT OFFICE.

GEORGE E. SCOTT, OF NEW YORK, N. Y., ASSIGNOR OF ONE-HALF TO JOHANNES J. M. MYER, OF NEW YORK, N. Y.

JOINING-LINK FOR CHAINS.

956,192.

Specification of Letters Patent. Patented Apr. 26, 1910.

Application filed December 1, 1909. Serial No. 530,887.

*To all whom it may concern:*

Be it known that I, GEORGE E. SCOTT, a citizen of the United States, residing in the borough of Manhattan, city, county, and State of New York, have invented a certain new and useful Improvement in Joining-Links for Chains, of which the following is a specification.

My present invention relates to an improved means of maximum simplicity and cheapness, whereby chain links may be easily and rapidly connected and disconnected; and this improvement will be found particularly useful in connection with chain treads for automobile tires.

In order to increase the driving and climbing power of automobile wheels, it has been a common practice to employ a system of metal chain work on the tires which, being forced into the road surface by the weight of the machine, produce the increased tractive effect aimed at. These generally take the form of two rim chains on opposite sides of the tire, connected by short cross chains linked at intervals into the rim chains. These are usually arranged to be easily applied to the tires when collapsed, but to embrace the tire so tightly when it is inflated as to hold the chains firmly in place. Owing to the great wear on the cross chains, to stretching of both rim chains and cross chains, and to other causes, it frequently becomes necessary to undo and replace the connections between links at various points in the chain system; and my improved device is intended to facilitate these operations in the simplest possible manner. It is to be understood, however, that my invention is applicable to all kinds of chains.

This invention, in a preferred form, is shown as applied to the chain treads of automobiles, in the accompanying drawing, wherein—

Figure 1:
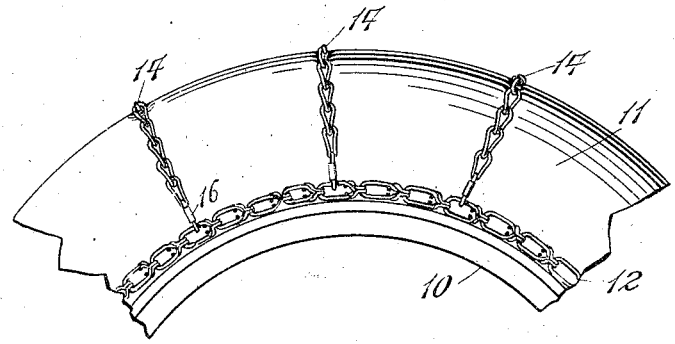
Figure 2:
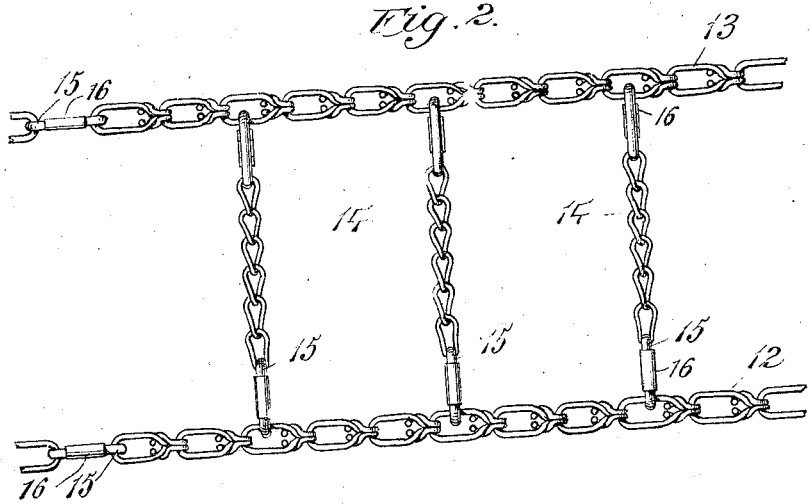
Figure 3:
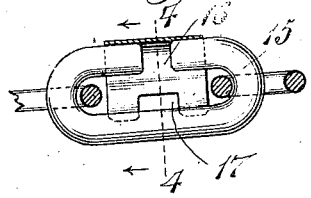
Figure 4:
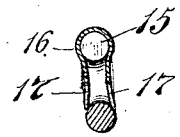

Figure 1 is a side elevation of a portion of an automobile tire, furnished with the invention, Fig. 2 is a portion of the chain tread spread flat and removed from the wheel, Fig. 3 is a side view of a joining link with the guard shown in section, and Fig. 4 is a sectional view of the same on the line 4—4 in Fig. 3.

I have shown the wheel rim at 10 and the inflated tire at 11. A portion of each rim chain is shown respectively at 12 and 13, and three of the cross chains which extend across the tread are shown in Figs. 1 and 2 at 14. The joining links, whereby union is accomplished between adjacent links, are shown at 15, and, as shown in Fig. 2, these may be employed in connection either with the connection of the ends of the cross chains with links in the rim chains, or for the purpose of closing the circular connection of the rim chains. Each joining link has preferably the form shown clearly in Fig 3, and has an opening near the middle of one side large enough to admit the links with which connection is to be made, and which are shown on each side of the link 15 in Fig. 3.

The closing of the opening and the securing of the adjacent links to prevent accidental separation is accomplished by means of a guard, 16, which straddles the ends of the link abutting upon the opening, and preferably extends entirely across the width of the link so that the tips of the guard embrace the side of the link which is opposite the opening.

The guard is adapted to be removed laterally, or by movement at right angles to the length of the link and I prefer to construct this guard of resilient metal and to give it the shape shown whereby the open side of the link 15 is embraced by the guard over more than a half circle. By use of this construction, the guard 16 is forced laterally onto the link 15, springing open to pass the open side of the link, and then springing closed again, so as to tightly clip both sides.

In order to facilitate removal of the guard, I prefer to provide the same with a convenient pushing edge upon which pressure may be conveniently brought to bear for thrusting off the guard. In the specific form shown this is done by making an inset, 17, in one or both of the edges of the guard, so placed that a flat instrument, such for instance as a key, may be introduced within the inset and between the side of the link and the longitudinal edge of the inset, which edge then constitutes the pushing edge, by pressure upon which the guard is forced off of the link, when the same is to be disconnected. When the guard is thus removed, the opening 16 is free, so that the adjoining links may readily be removed.

One advantage of this form of link, in connection with the chain tread of an automobile, is that, when used at the ends of the cross chains, it may be placed edgewise, as shown, and thus tend to hold the rim chain away from the tire, thus lessening wear.

What I claim is—

1. A joining link for chains open on one side, in combination with a guard adapted to close said opening and grip one side of the link, and arranged so as to be removable by lateral movement with relation to the link to free said opening, substantially as described.

2. A joining link for chains, open on one side, in combination with a laterally removable guard made of resilient metal adapted to close said opening and to spring onto the link and grip both sides thereof, substantially as described.

3. A joining link for chains, open on one side, in combination with a laterally removable guard made of resilient metal adapted to close said opening and spring onto said link so as to clip both sides thereof, said guard having an inset at its edge arranged to provide a space for introduction of a tool between the side of the link and the pushing edge of said inset, substantially as described.

GEORGE E. SCOTT.

Witnesses:
H. S. MacKaye,
M. A. Butler.